US010919638B2

(12) United States Patent
Hiller

(10) Patent No.: US 10,919,638 B2
(45) Date of Patent: Feb. 16, 2021

(54) AIRCRAFT CABIN PRESSURIZATION ENERGY HARVESTING

(71) Applicant: The Boeing Company, Chicago, IL (US)

(72) Inventor: Nathan D. Hiller, Irvine, CA (US)

(73) Assignee: The Boeing Company, Chicago, IL (US)

( * ) Notice: Subject to any disclaimer, the term of this patent is extended or adjusted under 35 U.S.C. 154(b) by 606 days.

(21) Appl. No.: 15/169,650

(22) Filed: May 31, 2016

(65) Prior Publication Data

US 2017/0341770 A1 Nov. 30, 2017

(51) Int. Cl.
| | | |
|---|---|---|
| *B64D 41/00* | (2006.01) | |
| *B64D 13/06* | (2006.01) | |
| *B64D 13/08* | (2006.01) | |
| *F01D 15/10* | (2006.01) | |
| *H02K 7/18* | (2006.01) | |

(52) U.S. Cl.
CPC ............. *B64D 41/00* (2013.01); *B64D 13/06* (2013.01); *B64D 13/08* (2013.01); *F01D 15/10* (2013.01); *H02K 7/1823* (2013.01); *B64D 2013/0648* (2013.01); *Y02T 50/50* (2013.01)

(58) Field of Classification Search
CPC ........ B64D 41/00; B64D 13/06; B64D 13/08; F01D 15/10; H02K 7/1823
See application file for complete search history.

(56) References Cited

U.S. PATENT DOCUMENTS

| | | | | |
|---|---|---|---|---|
| 4,523,517 A | * | 6/1985 | Cronin | B64D 13/06 237/2 A |
| 5,899,085 A | | 5/1999 | Williams | |
| 7,543,439 B2 | * | 6/2009 | Butt | F02C 7/32 290/4 C |
| 8,957,539 B1 | * | 2/2015 | Ralston | F01D 15/10 290/52 |
| 9,669,936 B1 | * | 6/2017 | Fiterman | B64D 13/06 |

(Continued)

FOREIGN PATENT DOCUMENTS

| | | |
|---|---|---|
| RU | 2431585 C2 | 10/2011 |
| RU | 2010124290 A | 1/2012 |
| RU | 2013107596 A | 9/2014 |

OTHER PUBLICATIONS

Office Action for related Russian Application No. 2017107763/11; report dated Jul. 10, 2020.

*Primary Examiner* — Viet P Nguyen
(74) *Attorney, Agent, or Firm* — Miller, Matthias & Hull LLP

(57) ABSTRACT

An energy harvesting system is provided and a corresponding method for harvesting energy from an aircraft cabin pressurization system utilizing the same. According to one aspect, an energy harvesting system includes an aircraft cabin enclosing a high-pressure environment of pressurized air. An air input receives incoming air from a low-pressure environment and an air output expels outgoing air from the high-pressure environment. A turbine receives the pressurized air expelled from the aircraft cabin and utilizes the pressurized air to produce rotational motion on a turbine shaft. An energy harvesting mechanism is coupled to the turbine shaft and utilizes the rotational motion from the turbine shaft to compress the incoming air or to create electrical energy.

20 Claims, 6 Drawing Sheets

(56) References Cited

U.S. PATENT DOCUMENTS

| | | | |
|---|---|---|---|
| 2009/0088063 A1* | 4/2009 | Schwarz | B64D 41/00 454/71 |
| 2011/0220759 A1 | 9/2011 | Stolte | |
| 2012/0292908 A1* | 11/2012 | Loison | B64D 37/08 290/52 |
| 2013/0214091 A1* | 8/2013 | Hillel | F01N 5/04 244/58 |
| 2015/0246733 A1* | 9/2015 | Silet | B64D 41/00 244/58 |
| 2016/0009409 A1* | 1/2016 | Rideau | B64D 41/00 290/44 |

* cited by examiner

AIRCRAFT CABIN PRESSURIZATION ENERGY HARVESTING

BACKGROUND

As an aircraft ascends, the ambient atmosphere decreases in pressure and temperature. To maintain passenger comfort and to provide oxygen within the aircraft cabin, conventional aircraft utilize air compressors to compress the cold, low-pressure atmospheric air and inject it into the aircraft cabin. A desired air pressure within the aircraft cabin is maintained while providing a fresh supply of oxygen by expelling the warm, pressurized air within the cabin to the external ambient atmosphere at an appropriate rate.

The continuous refreshing of the pressurized air within the aircraft cabin ultimately has a fuel cost associated with the process. On many aircraft, the electrical power associated with the operation of the air compressors originates from electrical generators that are mechanically coupled to the gearboxes of one or more of the aircraft's engines. The engines utilize additional fuel to overcome the additional rotational resistance from the electrical generators, which reduces the aircraft's fuel efficiency.

It is with respect to these considerations and others that the disclosure made herein is presented.

SUMMARY

It should be appreciated that this Summary is provided to introduce a selection of concepts in a simplified form that are further described below in the Detailed Description. This Summary is not intended to be used to limit the scope of the claimed subject matter.

Concepts and technologies described herein provide for an energy harvesting system associated with aircraft cabin pressurization and corresponding method for harvesting energy. According to one aspect, an energy harvesting system includes an aircraft cabin that encloses a high-pressure environment of pressurized air. The aircraft cabin has an air input for receiving incoming air from a low-pressure environment and an air output for expelling outgoing air from the high-pressure environment. A turbine receives the pressurized air expelled from the aircraft cabin and utilizes the pressurized air to produce rotational motion on a turbine shaft. An energy harvesting mechanism is coupled to the turbine shaft and utilizes the rotational motion from the turbine shaft to compress the incoming air or to create electrical energy.

According to yet another aspect, a method for harvesting energy from an aircraft cabin pressurization system is provided. The method includes receiving pressurized air from a high-pressure environment within an aircraft cabin. The pressurized air is released into a low-pressure environment through a turbine for imparting rotational motion to a turbine shaft. The rotational motion of the turbine shaft is received at an energy harvesting mechanism, where the rotational motion is used to compress incoming air to create pressurized air for the aircraft cabin. Alternatively, the rotational motion of the turbine shaft may be converted into electrical energy by the energy harvesting mechanism and provided to an electrical load.

According to another aspect, an energy harvesting system is provided. The system includes an aircraft cabin, a compressor, a turbine, and an energy harvesting mechanism. The aircraft cabin encloses a high-pressure environment of pressurized air. An air input receives incoming air from a low-pressure environment and an air output expels outgoing air from the high-pressure environment. The compressor receives the incoming air at a first pressure and provides the pressurized air to the high-pressure environment within the aircraft cabin at a second pressure that is higher than the first pressure. The turbine has a turbine shaft and receives pressurized air expelled from the aircraft cabin and uses the pressurized air to produce rotational motion on the turbine shaft. The energy harvesting mechanism is coupled to the turbine shaft and utilizes the rotational motion to compress the incoming air or create electrical energy for an electrical load. The turbine and the compressor are thermally coupled so that heat generated within a compression chamber of the compressor is transferred to an expansion chamber of the turbine.

The features, functions, and advantages that have been discussed can be achieved independently in various embodiments of the present disclosure or may be combined in yet other embodiments, further details of which can be seen with reference to the following description and drawings.

DETAILED DESCRIPTION

Figure 1:
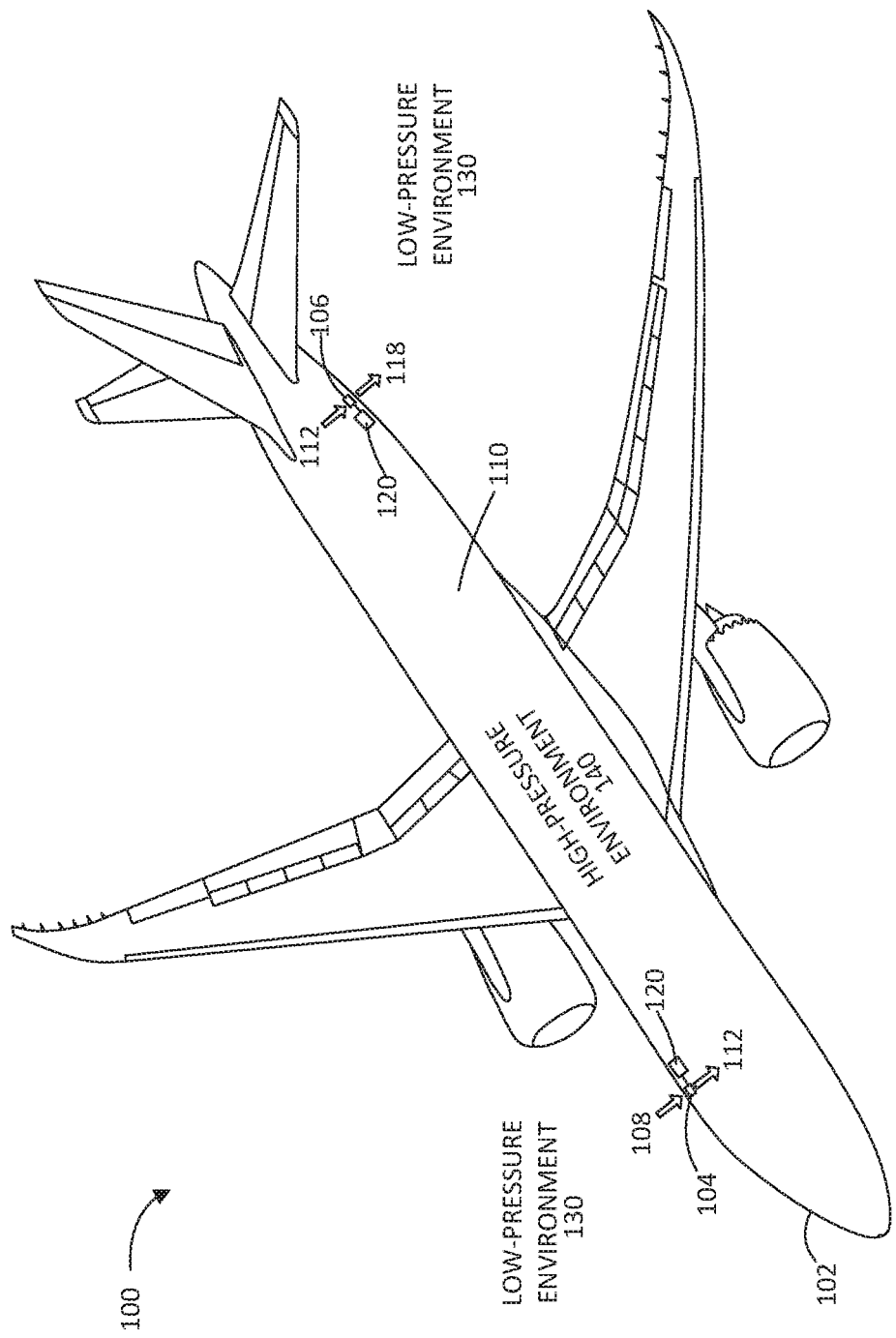
FIG. 1 is a perspective view of an aircraft having an air pressurization system configured with an energy harvesting system according to various embodiments described herein.

The following detailed description is directed to energy harvesting systems, and a corresponding method for harvesting energy from an aircraft cabin pressurization system utilizing the same. As discussed above, conventional aircraft cabin pressurization systems recycle air within the cabin by compressing cool, ambient air from outside the aircraft cabin to provide pressurized air, while venting the warmer pressurized air back to the ambient air outside the aircraft cabin. This air pressurization system decreases fuel efficiency as the aircraft engines utilize additional fuel to overcome the additional rotational resistance from the electrical generators used to power the air compressors.

Utilizing the concepts and technologies described herein, an energy harvesting system takes advantage of the warm, pressurized air expanding into the low-pressure environment as it is expelled from the aircraft cabin. The various embodiments discussed herein route the expelled air through a turbine that may be coupled to an air compressor, may be electrically coupled to an electrical generator, or both. Coupling the turbine to the air compressor provides the compressor with a rotational energy that may be used to compress incoming air. Coupling may include mechanically coupling two components such that the components are physically attached to one another, pneumatically coupling the components such that motion or action by one component pneumatically drives or acts on the other component, hydraulically coupling the components such that motion or action by one component hydraulically drives or acts on the other component, or a combination thereof.

Electrically coupling the turbine to an electrical generator creates electricity that may be provided to an electrical load, including an electric motor that may be used to drive a compressor to pressurize incoming air. Other examples of electrical loads that may receive the electrical power created by the generator will be described below. Moreover, heat energy may be harvested from the air compressor and provided back to the cold air entering the compressor, to the pressurized air entering the turbine, or to any suitable thermal load.

In the following detailed description, references are made to the accompanying drawings that form a part hereof, and which are shown by way of illustration, specific embodiments, or examples. Referring now to the drawings, in which like numerals represent like elements through the several figures, an energy harvesting system and method for utilizing the same to harvest energy from an aircraft cabin pressurization system according to the various embodiments will be described.

FIG. 1 shows a perspective view of an aircraft 102 having an air pressurization system 100 configured with an energy harvesting system 120 according to various embodiments described herein. The energy harvesting system 120 may be a component of an environmental control system (ECS) or a ventilation system of the aircraft 102 associated with an aircraft cabin pressurization system. The aircraft 102 includes an aircraft cabin 110, which encloses a high-pressure environment 140 of pressurized air 112. As discussed above, as the aircraft 100 climbs to higher altitudes, the pressure inside the aircraft cabin 110 is maintained, which is a higher pressure than the low-pressure environment 130 surrounding the aircraft 102. To provide the passengers with a continuous fresh supply of oxygen, the pressurized air 112 within the aircraft cabin 110 is refreshed with air from the low-pressure environment 130 outside the aircraft cabin 110. In doing so, the aircraft cabin 110 has an air input 104 and an air output 106. The locations of the air input 104 and the air output 106 are shown in arbitrary positions for illustrative purposes. The exact locations of the air input 104 and the air output 106 within the aircraft cabin 110 are not limited to the locations shown in FIG. 1.

As seen in FIG. 1, incoming air 108 flows from the low-pressure environment 130 through the air input 104 into the high-pressure environment 140 within the aircraft cabin 110. As the incoming air 108 passes through the air input 104, a compressor compresses the low-pressure air to create the pressurized air 112. As the pressurized air 112 is expelled from the aircraft cabin 110 through the air output 106, the outgoing air 118 expands into the low-pressure environment. Consequently, the pressurized air 112 possesses a large amount of potential energy. According to the various embodiments described herein, this potential energy is harvested by an energy harvesting system 120.

Figure 2:
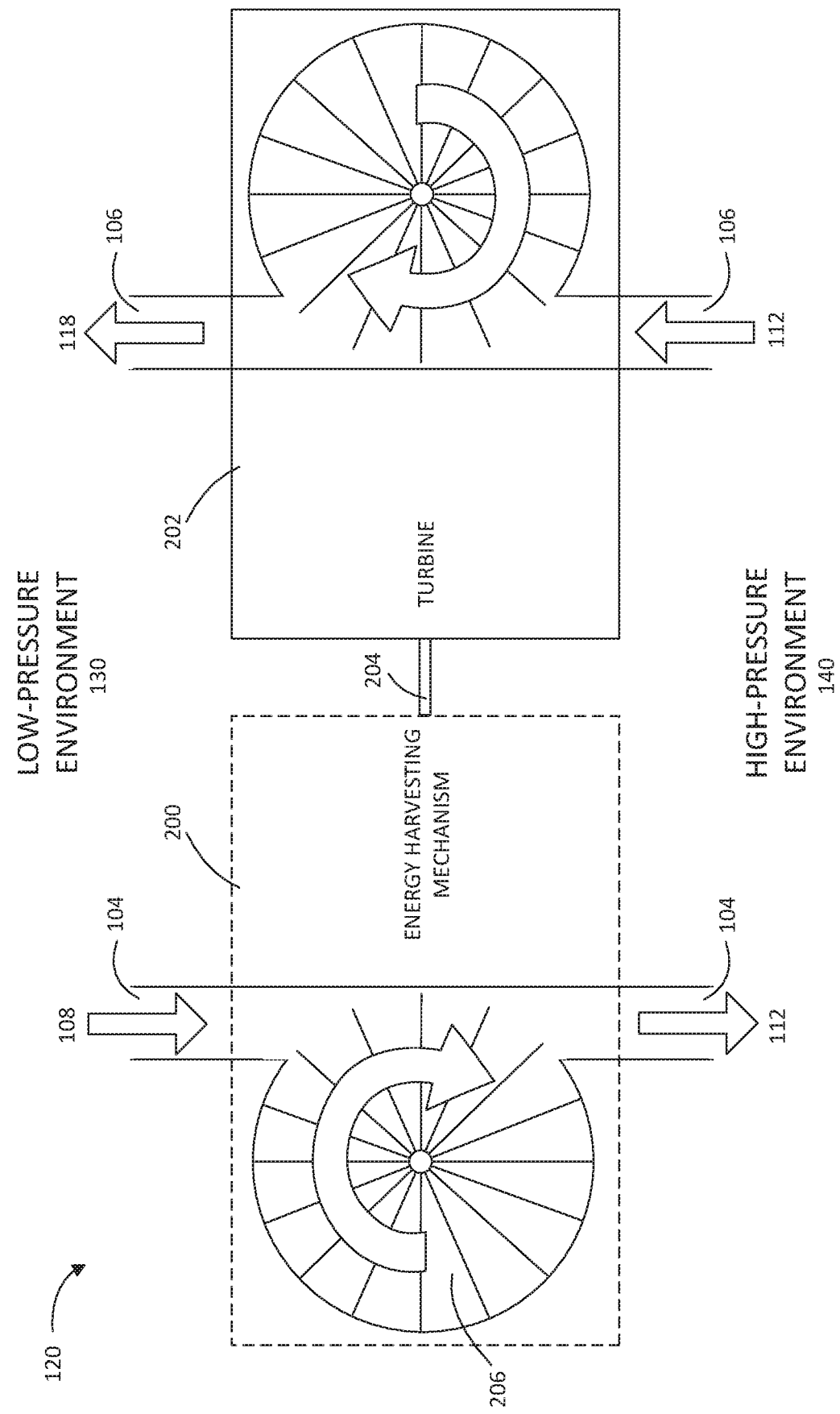
FIG. 2 is a diagram illustrating various aspects of an energy harvesting system according to various embodiments described herein.

Turning to FIG. 2, components of an energy harvesting system 120 will be described. According to various embodiments, the energy harvesting system 120 includes an energy harvesting mechanism 200 and a turbine 202, which are coupled together with a turbine shaft 204. The turbine 202 is coupled to the air output 106 in order to capture the energy of the pressurized air 112 as it expands into the low-pressure environment 130. This expansion imparts a rotational motion on the turbine shaft 204, which is coupled to the energy harvesting mechanism 200.

The energy harvesting mechanism 200 generally includes any components or devices that are directly or indirectly coupled to the turbine 202 that convert the rotational motion of the turbine shaft 204 to mechanical or electrical energy that may be used with an aircraft system. The various embodiments encompassing mechanical and electrical coupling of the energy harvesting mechanism 200 to the compressor or other load will be described in greater detail below with respect to FIGS. 3A and 3B.

FIG. 2 provides an overview of the flow of air in and out of an aircraft 102 through the air pressurization system 100, and the general configuration of the corresponding energy harvesting system 120 according to embodiments described herein. As the incoming air 108 is drawn into the compressor 206, the air is compressed and provided to the high-pressure environment 140 within the aircraft cabin 110 as pressurized air 112. The pressurized air 112 is continuously or periodically expelled back into the low-pressure environment 130 as fresh air is brought into the aircraft cabin 110. Due to the pressure and temperature differences between the pressurized air 112 in the high-pressure environment 140, which is warm and at a relatively high pressure compared with external air, and the cooler air in the low-pressure environment 130, the pressurized air 112 expands rapidly as it exits the aircraft cabin 110 through the air output 106. By utilizing a turbine 202 at the air output 106, the energy of the outgoing air 118 as it expands may be used to impart a rotational motion on the turbine shaft 204. The turbine shaft 204 is coupled to the energy harvesting mechanism 200, which directly or indirectly couples the turbine shaft 204 to the compressor 206 via mechanical or electrical coupling, respectively. In addition, or alternatively, the energy harvesting mechanism 200 may include an electrical generator and one or more electrical loads coupled to the turbine shaft 204.

Figure 3B:
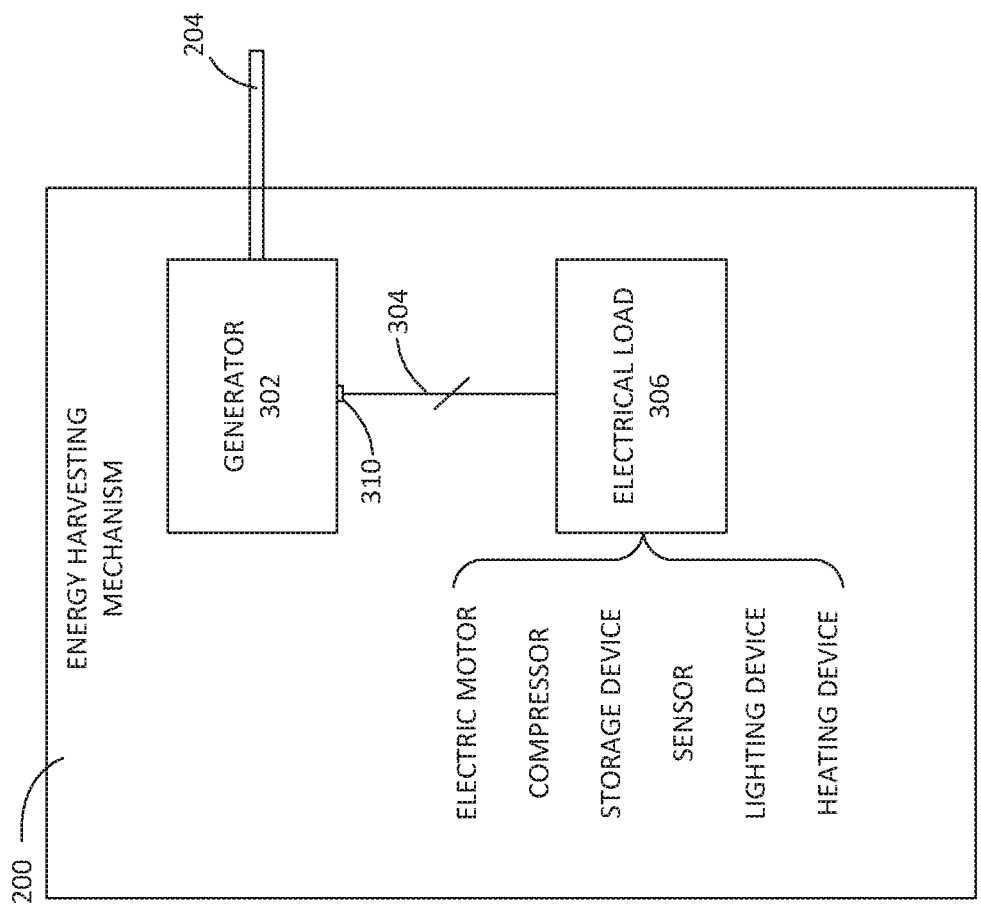
FIGS. 3A-3C are block diagrams showing components of an energy harvesting mechanism according to alternative embodiments described herein.
Figure 3A:
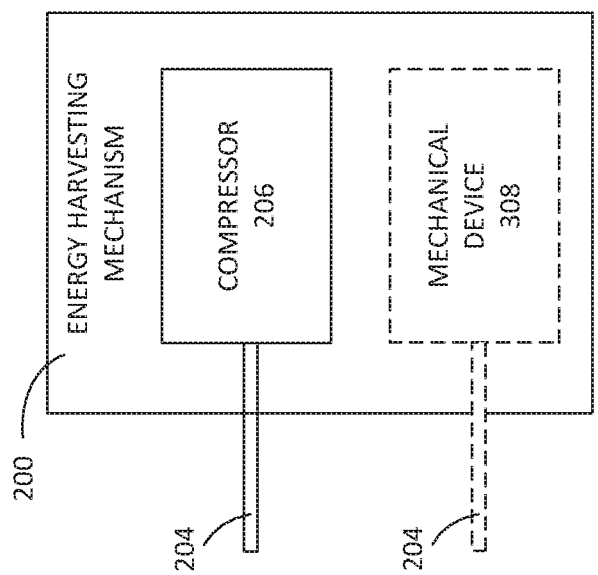
Figure 3C:
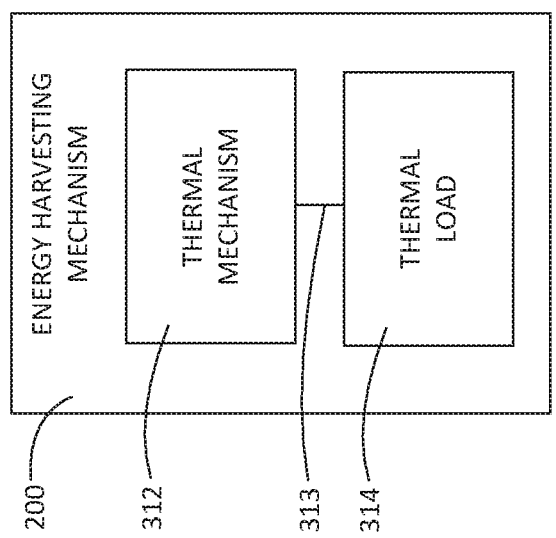

Turning to FIGS. 3A-3C, alternative embodiments of the energy harvesting mechanism 200 will be described. FIG. 3A shows a first embodiment associated with the energy harvesting mechanism 200 in which the turbine shaft 204 is directly or mechanically coupled to a device that utilizes the rotational motion of the turbine shaft 204 to do mechanical work. For example, the energy harvesting mechanism 200 of one embodiment includes a compressor 206 coupled to the turbine shaft 204. According to this embodiment, the turbine shaft 204 is directly and mechanically coupled to the compressor 206 so that rotation of the turbine 202 and corresponding turbine shaft 204 imparts a rotational motion on the compressor 206 to mechanically compress the incoming air 108. It should be appreciated that the turbine 202 may be mechanically coupled to any type or number of compressors 206 to create pressurized air 112 to be added to the high-pressure environment 140 within the aircraft cabin 110. The turbine 202 and the one or more compressors 206 may additionally or alternatively be pneumatically or hydraulically coupled to compress the incoming air 108.

By mechanically coupling the turbine 202 to the compressor 206, significantly less power is required to provide the pressurized air 112 to the aircraft cabin 110 since the compressor is substantially driven by the turbine 202. In an alternative mechanical coupling embodiment, the energy harvesting mechanism 200 includes any other type of mechanical device 308 that is directly or mechanically coupled to the turbine shaft 204 of the turbine 202 to utilize the rotational motion of the turbine shaft 204 to perform work. An example mechanical device 308 includes, but is not limited to, pumps for a hydraulic system of the aircraft 102 to control any applicable aircraft control system such as an elevator, rudder, aileron, high-lift device, or landing gear. A further non-limiting example of mechanical devices 308 include a fuel transfer pump, a fuel booster pump, and any other pump corresponding to an aircraft system.

FIG. 3B shows a second embodiment associated with the energy harvesting mechanism 200 in which the turbine shaft 204 is indirectly or electrically coupled to a device that utilizes the rotational motion of the turbine shaft 204 to do work. For example, the turbine shaft 204 may be directly coupled to an electrical generator 302, which uses the rotational motion of the turbine shaft 204 to create electrical energy 304 to power an electrical load 306. For the purposes of this disclosure, the conversion of the rotational motion of the turbine shaft 204 to electricity for powering an electrical load 306 is considered indirect coupling, or electrical coupling, of the turbine 202 or turbine shaft 204 to the electrical load 306. Similarly, any physical coupling between the turbine shaft 204 and a device is considered direct or mechanical coupling.

As shown in FIG. 3B, electrical energy 304 may be provided to any of various types of electrical loads 306 via an electrical output 310. The electrical output 310 is configured to electrically couple the electrical generator 302 to an electrical load 306. Examples of electrical loads 306 include, but are not limited to an electric motor, a compressor, an electrical energy storage device, a sensor, a lighting device, and a heating, ventilating, or cooling device. According to one embodiment, the outgoing air 118 from the aircraft cabin 110 drives a turbine 202, which imparts rotational motion on a turbine shaft 204. An electrical generator 302 coupled to the turbine shaft 204 creates electrical energy 304, which is supplied via an electrical output 310 to an electric motor. The electric motor is used to drive the compressor 206 to further compress incoming air 108 from the low-pressure environment 130. The potential uses for the electrical energy 304 are vast, encompassing any electrical system on the aircraft 102. It should be appreciated that converting the mechanical energy associated with the rotational motion of the turbine shaft 204 to electrical energy 304 is useful if the air input 104 and an air output 106 are located a distance from one another such that the mechanically coupling is not practical.

Figure 4A:
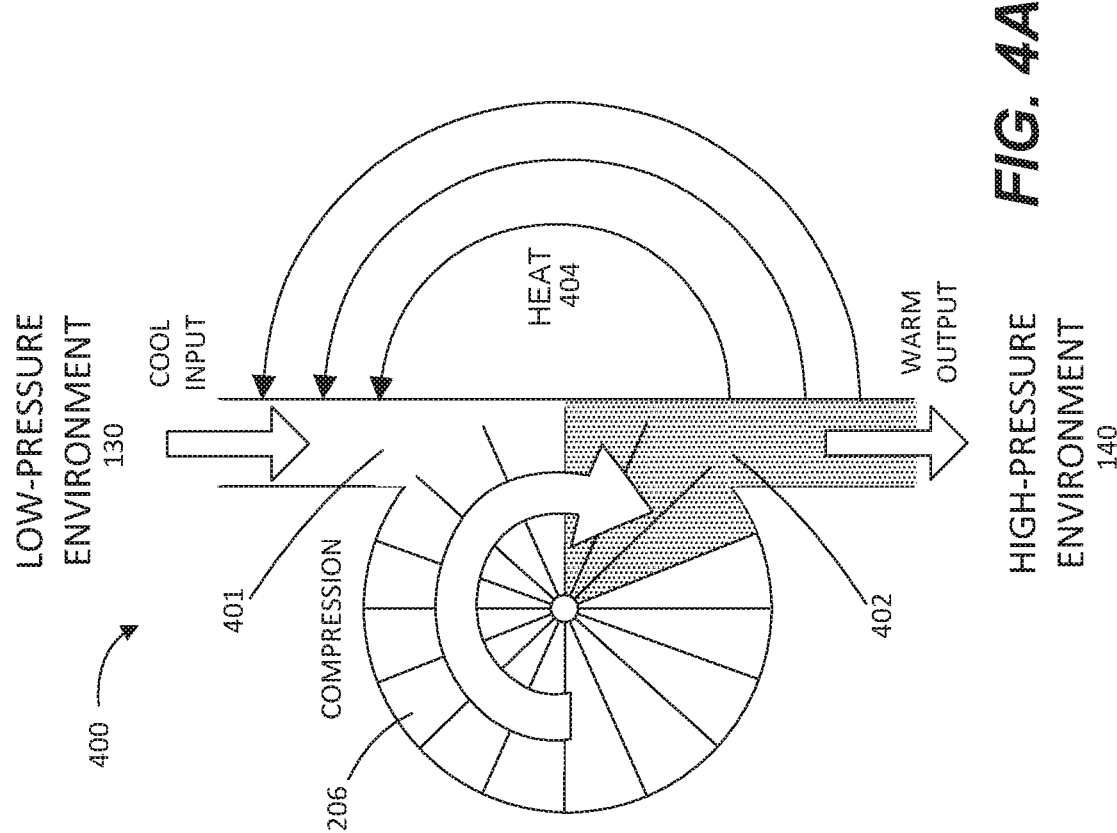
FIG. 4A shows a diagram illustrating energy harvesting associated with the transfer of thermal energy from a compressor to a thermal load according to alternative embodiments described herein.

FIG. 3C shows a third embodiment associated with the energy harvesting mechanism 200 in which the compressor 206 is not directly or indirectly coupled to a turbine shaft 204. Rather, according to this embodiment, heat energy 313 is harvested from the compressor 206 using a thermal mechanism 312, which is then provided to a thermal load 314. The thermal mechanism may be any material or device that transfers heat away from the compressor 206 and provides that heat to an appropriate system or thermal load 314. FIG. 4A illustrates one example of the embodiment of FIG. 3C. According to this example embodiment, a compression chamber 402 of the compressor 206 produces warm pressurized air that is output to the high-pressure environment 140. The heat 404 produced during this compression process may be transferred from the compression chamber 402 back to the entrance chamber 401 of the compressor 206 to increase the efficiency of the compressor 206. In this embodiment, the compressor 206 is the thermal load 314 receiving the heat energy 313 produced by the compressor 206 itself. The thermal mechanism 312 may include any type of heat sink material or mechanism commonly known in the art to transfer heat between the compression chamber 402 and the entrance chamber 401.

Returning to the embodiments utilizing a turbine 206, the mechanical or electrical output created from the rotation of the turbine shaft 204 increases as the efficiency of the turbine 202 increases. The efficiency of the turbine 202 may be increased by increasing the temperature of the pressurized air 112 prior to routing the air through the turbine 202. Increasing the temperature differential between the pressurized air 112 entering the turbine 202 and the air within the low-pressure environment 130 into which the pressurized air 112 is expelled into, increases the efficiency of the turbine 202 as the pressurized air 112 rapidly expands through the turbine towards the low-pressure environment 130. To increase the temperature of the pressurized air 112 entering the turbine 202, an expansion chamber 406 of the turbine 202 is thermally coupled to a compression chamber 402 of the compressor 206, according to various embodiments.

Figure 4B:
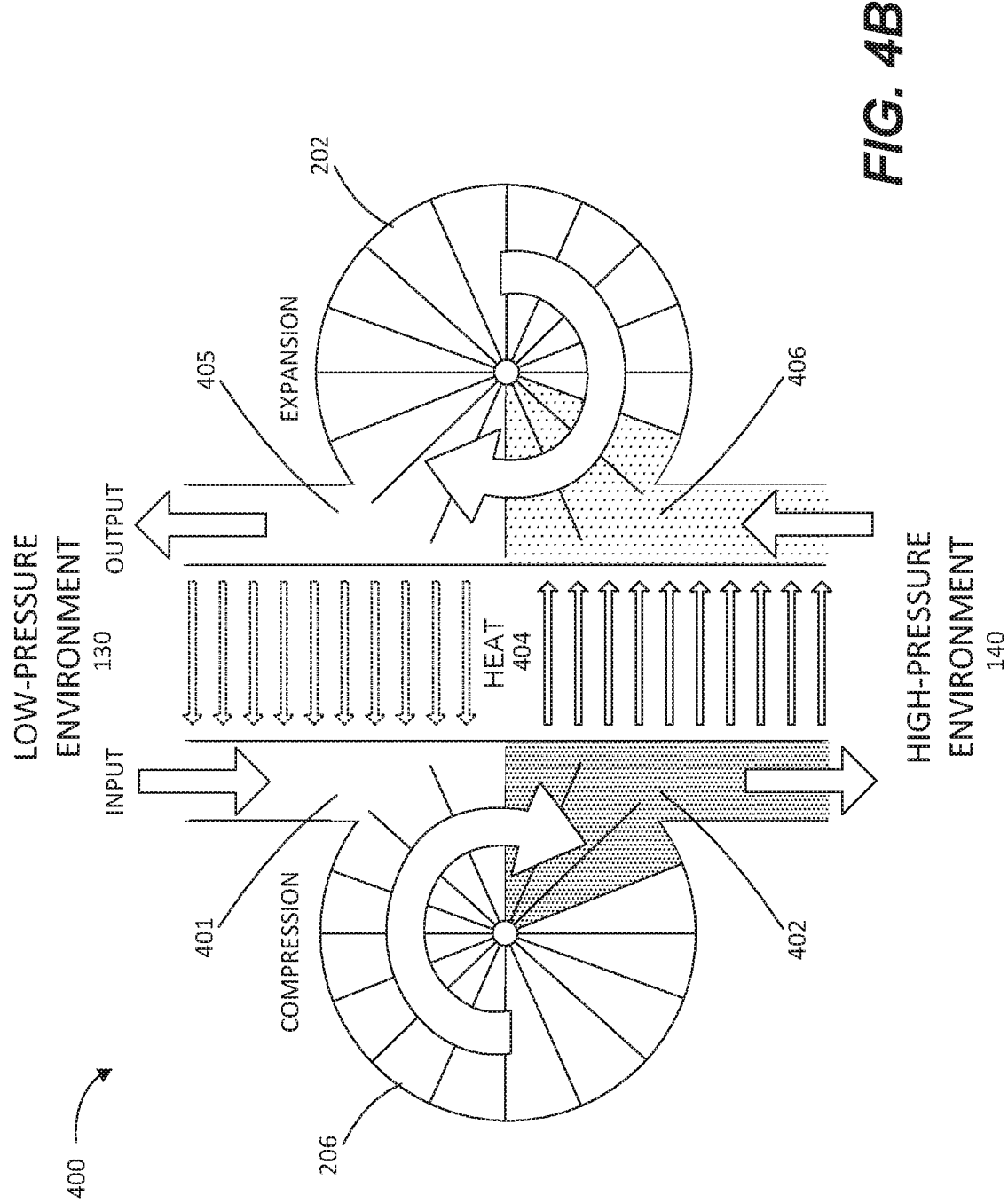
FIG. 4B shows a diagram illustrating thermal coupling of a compression chamber of a compressor and an expansion chamber of a turbine according to various alternative embodiments described herein.

FIG. 4B, illustrates embodiments in which a compression chamber 402 of a compressor 206 is thermally coupled to an expansion chamber 406 of a turbine 202 and an exit chamber 405 of the turbine 202 may be thermally coupled to the entrance chamber 401 of the compressor 206. The compression process that takes place within the compression chamber 402 of the compressor 206 creates heat 404. This heat 404 may be transferred in part to the pressurized air 112 entering the expansion chamber 406 of the turbine 202. For the purposes of this disclosure, thermal coupling includes placing the components to be thermally coupled in close proximity of one another, in contact with one another, or in thermal contact with one another via conductive material. Essentially, thermal coupling encompasses the use of any material or process used to facilitate the transfer of heat between thermally coupled components. Just as the heat 404 transfer from the compression chamber 402 of the compressor 206 to the expansion chamber 406 of the turbine 202 increases the efficiency of the turbine 202, heat energy 313 from the heated air within the turbine 202 expanding into the cool environment outside the aircraft may be transferred to the entrance chamber 401 of the compressor 206 to increase the efficiency of the compressor 206.

For example, referring to the compression chamber 402 of the compressor 206 and the expansion chamber 406 of the turbine 202, but equally applicable to the exit chamber 405 of the turbine 202 and the entrance chamber 401 of the compressor 206, the energy harvesting system 200 may be designed so that the compression chamber 402 of the compressor 206 is positioned adjacent to and in close proximity of the expansion chamber 406 of a turbine 202. Heat 404 is transferred from the heated incoming air 108 within the compression chamber 402 to the cooler outgoing air 118 within the expansion chamber 406. Alternatively, the compression chamber 402 and the expansion chamber 406 may be positioned such that they physically contact one another. A further alternative includes connecting the compression chamber 402 to the expansion chamber 406 with a conductive material like metal such that the expansion chamber 406 functionally becomes a heat sink for the compression chamber 402. This thermal coupling not only increases the efficiency of the turbine 202, but also reduces or eliminates the power conventionally used to cool the compressed air within the compression chamber 402 before it enters the aircraft cabin 110. It should be appreciated that the thermal coupling embodiments may be used in conjunction with the direct coupling embodiments described above with respect to FIG. 3A, as well as with the indirect coupling embodiments described above with respect to FIG. 3B.

To illustrate the benefits resulting from the use of an energy harvesting system 200 described herein, an example calculation will be provided with respect to an increase in fuel efficiency. Although the improved aircraft fuel efficiency is dependent on the number of passengers and cruising altitude, an estimate for a Boeing 787 Dreamliner at cruising altitude is approximately 0.19%-0.25%. The assumptions and formula used to arrive at this result will now be discussed.

At a cruising altitude of 40,000 ft, the cabin air pressure and fresh air flow are approximately 11.77 psi and 190 lbm/min, respectively if the aircraft 102 is not at capacity. If at capacity, fresh air flow is increased to approximately 245 lbm/min, which is a 29% increase over 190 lbm/min. Continuing the example using the 190 lbm/min air flow rate, if the air leakage at this altitude is assumed to be approximately 4.8%, the usable air flow rate is 190 lbm/min×(1−0.048)=181 lbm/min. The density of air at 11.77 psi and at a temperature of −70° F. is 0.0595 lbm/ft³. The air flow is 181 lbm/min/0.0595 lbm/ft³=3,042 cfm. The energy released by isothermal expansion of air under these conditions can be calculated by determining the energy stored in the aircraft cabin 110 using the equation $$W = p_B v_B \ln \frac{p_A}{p_B}$$

where W is the energy stored, $p_B$ is the pressure of the high pressure gas, $v_B$ is the volume of the pressurized gas, and $p_A$ is the pressure of the atmosphere. The amount of energy stored in a gas at a pressure of 11.77 psi (81.15 kPa) and temperature of 70° F. (294° K) at a flow rate of 3,042 cfm (1.435 cms) into the atmosphere at −70° F. (216.65° K) and pressure of 2.72 psi (18.75 kPa) is (81.15 kPa)×(1.435 cms)×ln(18.75 kPa/81.15 kPa)=−170.6 kW. The negative sign indicates this work is needed to transform the gas from State A (atmosphere) to State B (aircraft cabin).

Using the calculated quantity of energy stored in the aircraft cabin 110, the improvement in aircraft fuel efficiency can be calculated. Using the Boeing 787-9 as an example, the aircraft 102 has a range of 7,635 nmi, a cruising speed of 567 mph, and a fuel capacity of 33,384 gallons of Jet Fuel A (unleaded Kerosene, 37.12 kWh/gal=133,632 kWs/gal). The time required for a long-range flight would be 7,635 nmi/567 mph=13.46 hours (48,476 sec). The fuel consumption rate is therefore 33,384 gal/48,476 sec=0.688 gal/sec. The power required by the aircraft 102 is (133,632 kWs/gal)×(0.688 gal/sec)=91,939 kW. The improvement in aircraft fuel efficiency is therefore 170.6 kW/91,939 kW=0.19%. If the full capacity air flow rate of 245 lbm/min is used in the calculation, a 29% increase in the 0.19% fuel efficiency result becomes an improvement aircraft fuel efficiency of 1.29×0.19%=0.25%.

An example financial savings resulting from a 0.25% improvement in fuel efficiency is approximately $42,547 per year per aircraft. This value is based on 3,431 flight hours per year per aircraft. Using a long haul flight time of 13.46 hours this equates to 3,431/13.46=254.9 flights per year. The gallons of fuel used per year are therefore 254.9×33,384=8,509,581. The gallons saved are 8,509,581×0.0025=21,273 gallons/year. For a fuel price of $2/gal, airlines would save $42,547/year/aircraft.

Figure 5:
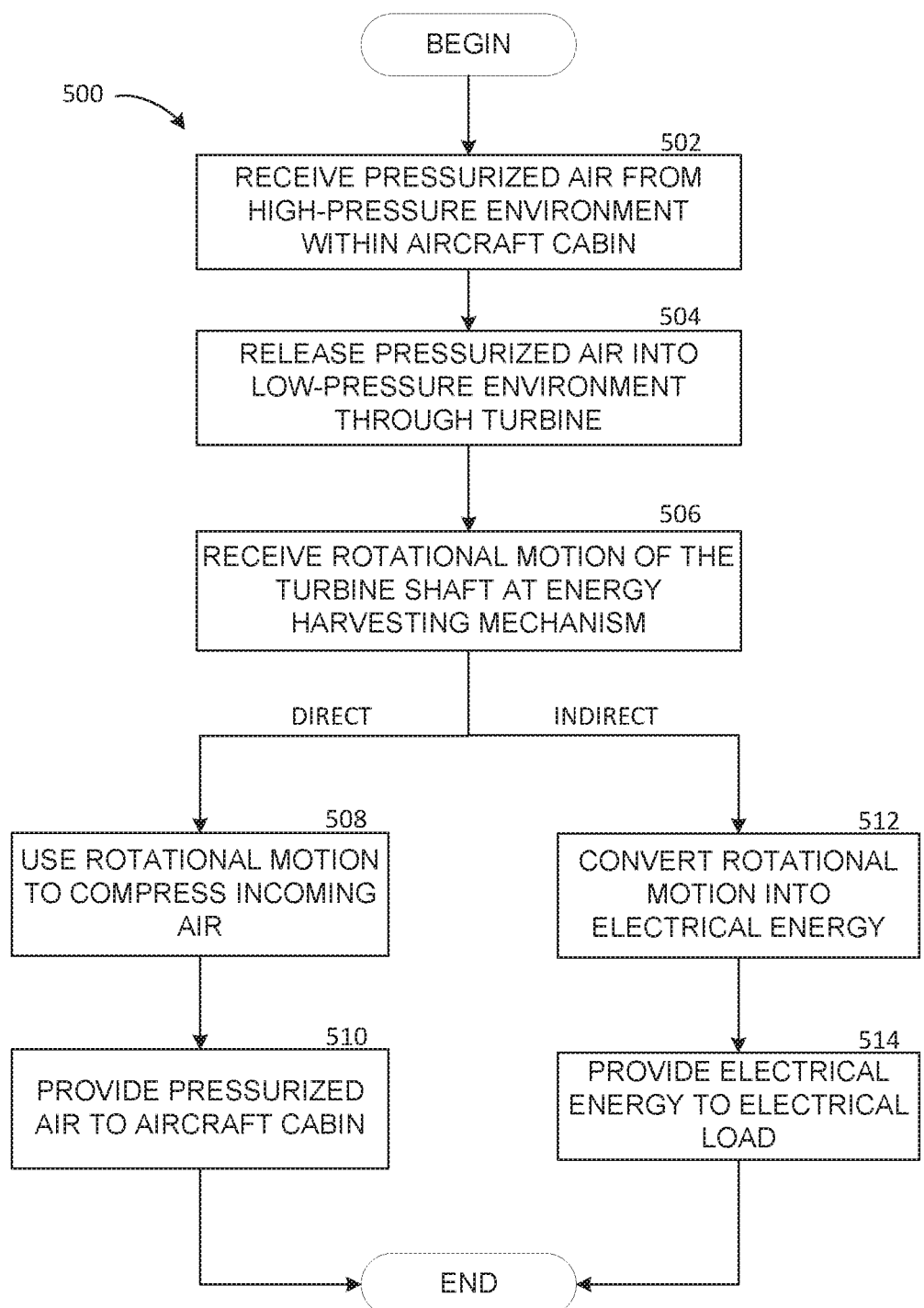
FIG. 5 is a flow diagram showing a method for harvesting energy from an aircraft cabin pressurization system according to various embodiments described herein.

FIG. 5 shows a routine 500 for harvesting energy from an aircraft cabin pressurization system 100 according to various embodiments presented herein. It should be appreciated that more or fewer operations may be performed than shown in the figures and described herein. These operations may also be performed in parallel, or in a different order than those described herein.

The routine 500 begins at operation 502, where pressurized air 112 is received from the high-pressure environment 140 within the aircraft cabin 110. At operation 504, the pressurized air 112 is released as outgoing air 118 to the low-pressure environment 130 through a turbine 202. The routine 500 continues from operation 504 to operation 506, where the rotational motion imparted on the turbine shaft 204 of the turbine 202 from the pressurized air 112 expanding into the low-pressure environment 130 is received at the energy harvesting mechanism 200.

As described above, the energy harvesting mechanism 200 may include a compressor 206 directly coupled to the turbine shaft 204. In the direct coupling embodiment, the routine 500 proceeds from operation 506 to operation 508, where the rotational motion of the turbine shaft 204 is imparted on the compressor 206 to which turbine shaft 204 is mechanically coupled, compressing incoming air 108 to create pressurized air 112. The pressurized air 112 is provided to the high-pressure environment 140 in the aircraft cabin 110 at operation 510, and the routine 500 ends.

However, if the energy harvesting mechanism 200 is indirectly coupled to the turbine shaft 204, then the routine 500 proceeds from operation 506 to operation 512, where the rotational motion of the turbine shaft 204 is converted into electrical energy 304. As discussed above, this indirect coupling embodiment includes coupling a generator 302 to the turbine shaft 204 to create the electrical energy 304 from the associated rotational motion. The routine 500 continues from operation 512 to operation 514, where the electrical energy 304 is provided to an electrical load 306 via an electrical output 310, and the routine 500 ends.

Based on the foregoing, it should be appreciated that technologies for an energy harvesting system for use with an aircraft cabin pressurization system, and a corresponding method for harvesting energy utilizing the same are provided herein. The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

What is claimed is:

1. An energy harvesting system, comprising:
an aircraft cabin enclosing a high-pressure environment comprising an interior aircraft cabin air at a first air pressure and an air temperature, the aircraft cabin defining a low-pressure environment exterior of the aircraft cabin comprising an exterior aircraft cabin air at a second air pressure lower than the first air pressure;
an energy harvesting mechanism fluidly communicating between the aircraft cabin and the low-pressure environment, the energy harvesting mechanism comprising an entrance chamber configured to receive the exterior aircraft cabin air, and a compressor coupled to a turbine shaft configured to compress the received exterior aircraft cabin air in response to a rotational motion of the turbine shaft and direct the compressed air into the aircraft cabin at the first air pressure, in which the compressor defines a compression chamber configured to warm the compressed air; and a turbine fluidly communicating between the aircraft cabin and the low-pressure environment, the turbine comprising an expansion chamber configured to receive the interior aircraft cabin air and expand the received air from the first air pressure to the second air pressure, and an exit chamber configured to direct the expanded air to the low-pressure environment, in which the turbine is configured to produce rotational motion of the turbine shaft in response to the received interior aircraft cabin air expanding and the expansion chamber is thermally coupled to the compression chamber such that heat generated within the compression chamber is transferred to the expansion chamber.

2. The energy harvesting system of claim 1, wherein the compressor is configured to receive the exterior aircraft cabin air at the second air pressure.

3. The energy harvesting system of claim 1, wherein the system further comprises:
an electrical generator coupled to the turbine shaft and configured to convert the rotational motion into electrical energy; and
an electrical output configured to electrically couple the electrical generator to an electrical load for providing the electrical energy to the electrical load.

4. The energy harvesting system of claim 3, wherein the electrical load comprises an electric motor.

5. The energy harvesting system of claim 3, wherein the electrical load comprises at least one of an electric motor, an electrical energy storage device, a sensor, a lighting device, and a heating device.

6. The energy harvesting system of claim 3, wherein the compressor is configured to receive the exterior aircraft cabin air at the second air pressure.

7. The energy harvesting system of claim 1, wherein
the compressor is mechanically coupled to the turbine shaft, the compressor configured to receive the exterior aircraft cabin air at the second air pressure; and
the energy harvesting system further comprises:
an electrical generator coupled to the turbine shaft and configured to convert the rotational motion into electrical energy; and
an electrical output configured to electrically couple the electrical generator to an electrical load for providing the electrical energy to the electrical load.

8. The energy harvesting system of claim 1, wherein the energy harvesting system is one of an environmental control system (ECS) and a ventilation system.

9. The energy harvesting system of claim 1, in which the exit chamber is thermally coupled to the entrance chamber of the compressor.

10. A method of harvesting energy from an aircraft cabin pressurization system, the method comprising:
receiving exterior aircraft cabin air from an entrance chamber of an energy harvesting mechanism into a high-pressure environment formed within an aircraft cabin, the aircraft cabin enclosing interior aircraft cabin air having a first air pressure and an air temperature;
releasing the interior aircraft cabin air from the high-pressure environment within the aircraft cabin to a low-pressure environment, exterior of the aircraft cabin, through an exit chamber of a turbine, wherein the low-pressure environment comprises the exterior aircraft cabin air at a second air pressure lower than the first air pressure;
imparting rotational motion to a turbine shaft of the turbine comprising an expansion chamber configured to receive the interior aircraft cabin air, wherein the expansion chamber receives the interior aircraft cabin air at the first air pressure and the air temperature and imparts the rotational motion to the turbine shaft in response to the interior aircraft cabin air expanding from the first air pressure to the second air pressure;
receiving the rotational motion of the turbine shaft at the energy harvesting mechanism directly coupled to the turbine shaft; and
at the energy harvesting mechanism comprising a compressor configured to compress the exterior aircraft cabin air received from the entrance chamber in response to a rotational motion of the turbine shaft and direct the compressed air into the aircraft cabin at the first air pressure, in which the compressor defines a compression chamber configured to warm the compressed air and the expansion chamber is thermally coupled to the compression chamber such that heat generated within a compression chamber of the compressor is transferred to an expansion chamber of the turbine.

11. The method of claim 10, wherein the compressor is mechanically coupled to the turbine shaft, the compressor configured to utilize the rotational motion from the turbine shaft to compress the exterior aircraft cabin air to create the compressed air.

12. The method of claim 10, wherein thermally coupling the turbine and the compressor comprises connecting the compression chamber to the expansion chamber with thermally conductive material.

13. The method of claim 10, wherein the aircraft cabin pressurization system comprises an electrical generator coupled to the turbine shaft such that the electrical generator converts the rotational motion into electrical energy.

14. The method of claim 13, further comprising storing the electrical energy from the electrical generator in an electrical energy storage device.

15. The method of claim 13, wherein the electrical energy is provided to at least one of an electric motor, an electrical energy storage device, a sensor, a lighting device, and a heating device.

16. The method of claim 13, wherein the electrical energy is provided to an electric motor.

17. The method of claim 13, wherein the compressor is configured to receive the exterior aircraft cabin air at the second air pressure.

18. An energy harvesting system, comprising:
an aircraft cabin enclosing a high-pressure environment comprising an interior aircraft cabin air at a first air pressure and an air temperature, the aircraft cabin defining a low-pressure environment exterior of the aircraft cabin having an exterior aircraft cabin air at a second air pressure lower than the first air pressure;
an energy harvesting mechanism comprising an electrical generator coupled to a turbine shaft configured to convert a rotational motion of the turbine shaft into electrical energy, and an electrical output configured to electrically couple the electrical generator to an electrical load for providing the electrical energy to the load;
a compressor configured to compress a received exterior aircraft cabin and direct the compressed air into the aircraft cabin at the first air pressure, in which the compressor comprises an entrance chamber and the compressor defines a compression chamber configured to warm the compressed air; and
a turbine fluidly communicating between the aircraft cabin and the low-pressure environment, the turbine comprising an expansion chamber configured to receive the interior aircraft cabin air and expand the received air from the first air pressure to the second air pressure, and an exit chamber configured to direct the expanded air to the low-pressure environment, in which the turbine is configured to produce rotational motion of the turbine shaft in response to the received interior aircraft cabin air expanding and the expansion chamber is thermally coupled to the compression chamber such that heat generated within the compression chamber is transferred to the expansion chamber.

19. The energy harvesting system of claim 18, in which the energy harvesting mechanism further comprises at least one of an electric motor operative to drive the compressor, an electrical energy storage device, a sensor, a lighting device, and a heating device.

20. The energy harvesting system of claim 19, in which the electric motor is configured to drive the compressor configured to receive the exterior aircraft cabin air at the second air pressure and provide the pressurized exterior aircraft cabin air to the high pressure environment within the aircraft cabin at the first air pressure.

\* \* \* \* \*